(12) United States Patent
Yarita et al.

(10) Patent No.: US 7,294,895 B2
(45) Date of Patent: Nov. 13, 2007

(54) CAPACITIVE DYNAMIC QUANTITY SENSOR AND SEMICONDUCTOR DEVICE

(75) Inventors: Mitsuo Yarita, Chiba (JP); Minoru Sudou, Chiba (JP); Kenji Kato, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 11/099,163

(22) Filed: Apr. 5, 2005

(65) Prior Publication Data

US 2005/0242413 A1 Nov. 3, 2005

(30) Foreign Application Priority Data

| Apr. 5, 2004 | (JP) | 2004-110653 |
|---|---|---|
| Apr. 5, 2004 | (JP) | 2004-110654 |
| Jun. 7, 2004 | (JP) | 2004-167881 |
| Jun. 24, 2004 | (JP) | 2004-186161 |
| Jul. 13, 2004 | (JP) | 2004-206476 |
| Apr. 1, 2005 | (JP) | 2005-106297 |

(51) Int. Cl.
*H01L 29/82* (2006.01)

(52) U.S. Cl. .............. 257/415; 257/254; 257/595; 257/600; 257/602; 257/700

(58) Field of Classification Search .............. None
See application file for complete search history.

(56) References Cited

U.S. PATENT DOCUMENTS 5,296,730 A * 3/1994 Takano et al. .............. 257/417
6,215,318 B1 * 4/2001 Schoefthaler et al. ........ 324/658

* cited by examiner

*Primary Examiner*—Evan Pert
*Assistant Examiner*—Tan Tran
(74) *Attorney, Agent, or Firm*—Adams & Wilks

(57) ABSTRACT

A capacitive dynamic quantity sensor whose size is small and whose reliability and mass productivity are high is provided. In order to realize signal transmission from a lower electrode to an upper electrode, silicon columns which are electrically isolated from one another but not mechanically isolated from one another are formed to connect both electrodes.

7 Claims, 17 Drawing Sheets

CAPACITIVE DYNAMIC QUANTITY SENSOR AND SEMICONDUCTOR DEVICE

BACKGROUND OF THE INVENTION

1. Field of the Invention

The present invention relates to a capacitive dynamic quantity sensor for detecting angular velocity or acceleration of an automobile or the like and a semiconductor device for converting an image of an object into a video signal.

2. Description of the Related Art

FIG. 18 shows a conventional capacitive dynamic quantity sensor. A capacitive dynamic quantity sensor for acceleration 507 includes a lower glass plate 501, a silicon plate 502, and an upper glass plate 503, which are laminated. The silicon plate 502 has a weight 521 which is displaced due to acceleration applied thereto and a column 522 which is necessary to reduce a size of the sensor and electrically connects a capacitance detection electrode 511 provided on the lower glass plate 501 with an electrode 535 provided outside the upper glass plate 503. The upper glass plate 503 has an electrode 531 for detecting displacement of the weight 521 due to the acceleration as a change in capacitance. The lower glass plate 501 has the electrode 511 for detecting displacement of the weight 521 due to the acceleration as a change in capacitance. The column 522 located in the silicon plate 502 is formed by laser processing or etching and generally separated from the weight (For example, see, Masayoshi Esashi, "Micromachining and micromachine", The Institute of Electrical Engineers of Japan, Volume 114-A, Number 7/8, 1994) However, when the column is formed, it is necessary to separate the column from other members by etching or the like after it is temporarily fixed to a glass substrate by anode bonding or the like. Consequently, a surface of the electrode patterned on the glass plate is also subjected to an unintended etching process and the like, with the result that problems occur with respect to the improvements of mass productivity and reliability.

Even in the case where the column is not fixed to the glass plate or the like by anode bonding, when the column is mechanically separated from other members, a main body portion and the column cannot be electrically connected with each other. When devices are formed on both surfaces of the glass plate, an electrical signal cannot be led from a device formed on one surface. Thus, a structure capable of leading electrical signals from the devices formed on both surfaces is required for mounting, thereby increasing a manufacturing cost.

SUMMARY OF THE INVENTION

The present invention has been made in view of the circumstances described above. Hereinafter, description will be made of: means for improving mass productivity and reliability of a capacitive dynamic quantity sensor, to thereby reduce a size of the entire sensor; and means for allowing an electrical signal to be led from a device formed on one surface when devices are formed on both surfaces of a semiconductor substrate, to thereby reduce sizes of the devices and their manufacturing costs.

According to the present invention, in order to solve the above-mentioned problems, there is provided a sensor having the following construction.

That is, a column is formed in a semiconductor so that an electrode on a first insulator is electrically connected with an electrode on a second insulator, and an upper portion of the column is electrically isolated without mechanical separation.

In addition, the first impurity contained in the semiconductor in which the column is formed is an N-type and the second impurity formed in the part of the upper portion of the column is a P-type.

Further, each column is composed of an upper conductive portion, an intermediate insulating portion, and a lower conductive portion, the upper conductive portion and the lower conductive portion includes a first slit and a second slit, respectively, which are formed for mechanical separation, and the intermediate insulating portion is electrically isolated without mechanical separation.

In addition, in a semiconductor electrical circuit part, including: a first insulator having an electrode pattern formed thereon; and a substrate that includes a first semiconductor having an image pickup element formed therein, a second semiconductor having an electrical circuit element formed therein, and an insulator sandwiched between the first semiconductor and the second semiconductor, the first insulator and the substrate being laminated, the semiconductor electrical part performing image processing based on a signal from the image pickup element and a signal from the electrical circuit element, a column is formed in each of the first semiconductor and the second semiconductor so that an electrode of the first semiconductor is electrically connected with an electrode of the second semiconductor, the column is composed of an upper conductive portion, an intermediate insulating portion, and a lower conductive portion, and a lower portion of the column is electrically isolated without mechanical separation.

In addition, in a semiconductor electrical circuit part, including: a substrate that includes a first semiconductor having a first electrical circuit element formed therein, a second semiconductor having a second electrical circuit element formed therein, and an insulator sandwiched between the first semiconductor and the second semiconductor, the semiconductor electrical circuit part operating based on a signal from the first electrical circuit element and a signal from the second electrical circuit element, a column is formed in each of the first semiconductor and the second semiconductor so that an electrode of the first semiconductor is electrically connected with an electrode of the second semiconductor, the column is composed of an upper conductive portion, an intermediate insulating portion, and a lower conductive portion, and an upper portion of the column is electrically isolated without mechanical separation.

According to the present invention, the capacitive dynamic quantity sensor has a structure in which the silicon columns for transferring signals from the respective electrodes are electrically isolated from one another without the mechanical separation of the upper portion of each of the columns, the intermediate portion thereof, or both of the upper portion and the intermediate portion. Accordingly, it is unnecessary to perform etching for column separation after anode bonding. Thus, for example, an unintended etching process to a lower electrode pattern is unnecessary, with the result that a size of the sensor can be reduced without reductions in reliability and mass productivity.

According to the present invention, the semiconductor electrical circuit part has a structure in which the silicon columns for transferring signals from the respective electrodes are electrically isolated from one another without the mechanical separation of the lower and intermediate portions of each of the columns. Accordingly, it is unnecessary to perform etching for column separation after anode bonding. Thus, for example, an unintended etching process to the electrode pattern on the insulator is unnecessary, with the result that a reduction in area of the semiconductor electrical circuit part and simplification of mounting thereof can be realized without reductions in reliability and mass productivity.

According to the present invention, the semiconductor electrical circuit part has a structure in which the silicon columns for transferring signals from the respective electrodes are electrically isolated from one another without the mechanical separation of the upper and intermediate portions of each of the columns. None of the columns is mechanically separated from other members. Accordingly, when an electrical circuit is formed on each of surfaces of a semiconductor device, all electrical signals can be led from one side thereof. As a result, a reduction in area of a semiconductor chip and simplification of mounting thereof can be realized without reductions in reliability and mass productivity.

DETAILED DESCRIPTION OF THE EMBODIMENTS

Figure 1:
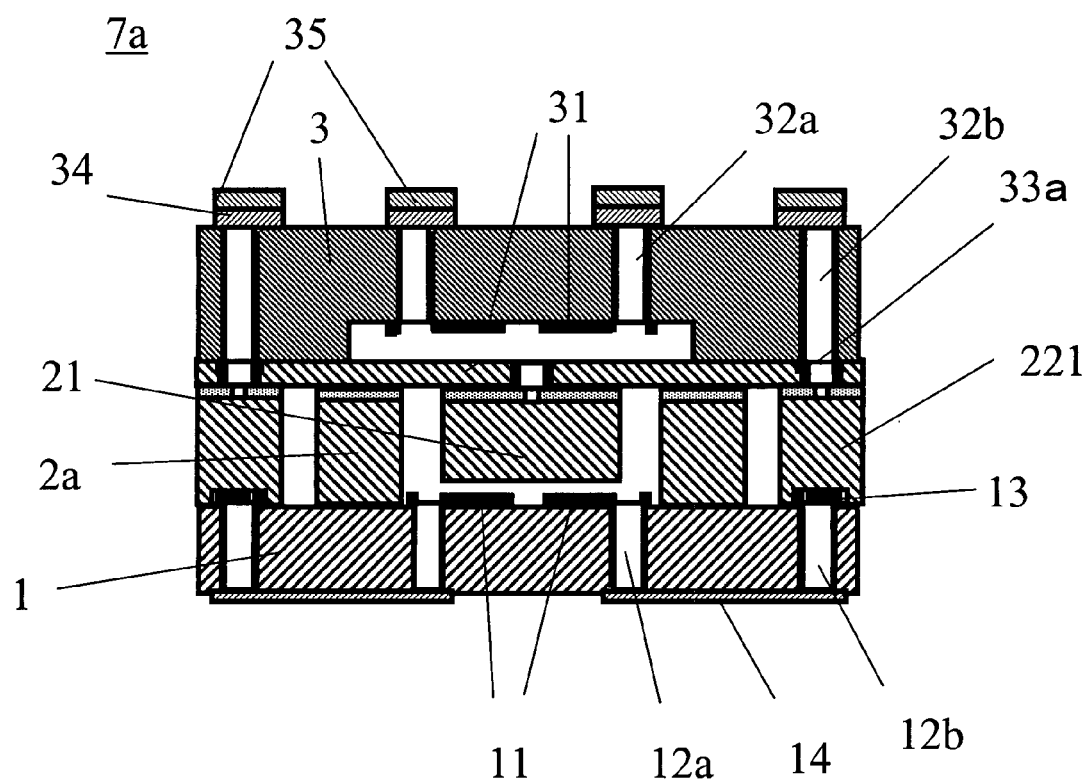
FIG. 1 is a side sectional view showing a capacitive dynamic quantity sensor according to Embodiment 1 of the present invention.

A basic structure according to Best Mode 1 of the present invention will be described. A capacitive dynamic quantity sensor is composed of a lower glass plate also serving as a substrate thereof, a silicon plate, and an upper glass plate. The silicon plate has a weight displaced due to a dynamic quantity and silicon columns, each of which is used for electrically connecting an electrode located on the lower glass plate with an electrode located outside the upper glass plate. An insulating layer having a hole is located in the upper portion of each of the silicon columns and a conductive film is located thereon to avoid an electrical signal from leaking to another column, so that electrical conduction can be made between upper and lower portions of each of the silicon columns.

Next, a basic structure according to Best Mode 2 of the present invention will be described. The basic structure is substantially identical to that in Best Mode 1 and thus only a different point will be described. In Best Mode 2 of the present invention, a part of the upper portion of the silicon column is doped with an impurity different from an impurity with which the silicon plate is doped to produce a depletion layer therein. As a result, an electrical signal is prevented from leaking to another column, so that the electrical conduction can be made between the upper and lower portions of the silicon column.

Next, a basic structure according to Best Mode 3 of the present invention will be described. The basic structure is substantially identical to that in Best Mode 1 and thus only a different point will be described. In Best Mode 3 of the present invention, a slit is formed in a part of the upper portion of the silicon column. As a result, an electrical signal is prevented from leaking to another column, so that the electrical conduction can be made between the upper and lower portions of the silicon column.

According to a basic manufacturing method, first, the silicon plate is prepared and vertically processed from the lower side by dry etching to form the weight and the silicon columns. Next, a process for making electrical isolation among the upper sides of the columns and a process for forming the upper side of the weight are performed. Then, the lower glass plate is prepared and the silicon plate is bonded thereto. After that, the upper glass plate is bonded to the silicon plate.

A basic structure according to Best Mode 4 of the present invention will be described. A semiconductor electrical circuit part includes an insulator made of glass, an upper semiconductor in which an image pickup element is located, a lower semiconductor in which an electrical circuit is located, an insulator located to be sandwiched between the upper semiconductor and the lower semiconductor, and a silicon column for electrically connecting an electrode located on the upper semiconductor with an electrode located on the lower semiconductor. An insulating layer having a hole is located in the lower portion of the silicon column and a conductive film is located thereon to avoid an electrical signal from leaking to the second semiconductor, so that electrical conduction can be made between upper and lower portions of the silicon column.

According to a basic manufacturing method, first, the silicon plate is prepared and vertically processed from the upper side by dry etching to form an image pickup element portion and the silicon column, thereby producing the image pickup element and a circuit. After that, a process for making electrical isolation on the lower side of the column and a process for producing a circuit element in the lower semiconductor are performed. Then, the upper glass plate is prepared and the silicon plate is bonded thereto.

A basic structure according to Best Mode 5 of the present invention will be described. A semiconductor electrical circuit part includes an upper semiconductor in which an electrical circuit is located, a lower semiconductor in which an electrical circuit is located, an insulator located to be sandwiched between the upper semiconductor and the lower semiconductor, and a silicon column for electrically connecting an electrode located on the upper semiconductor with an electrode located on the lower semiconductor. An insulating layer having a holed portion is located in the upper portion of the silicon column and a conductive film is located thereon to avoid an electrical signal from leaking to the first semiconductor, so that electrical conduction can be made between the upper and lower portions of the silicon column.

According to a basic manufacturing method, first, the silicon plate is prepared and vertically processed from the lower side by dry etching to form an electrical circuit portion and the silicon column, thereby producing the circuit element in the lower semiconductor. After that, a process for making electrical isolation on the upper side of the column and a process for producing a circuit element in the upper semiconductor are performed. Then, the semiconductor electrical circuit part is mounted on an insulator substrate, in which an electrode pattern to be connected with the lower portion of the silicon column and the electrode of the lower semiconductor is provided, by using solder bumps or the like.

Embodiment 1

Hereinafter, a capacitive dynamic quantity sensor according to Embodiment 1 of the present invention will be described with reference to FIGS. 1 to 5. FIG. 1 is a side sectional view showing a capacitive dynamic quantity sensor 7a according to this embodiment.

The capacitive dynamic quantity sensor 7a has a structure in which a lower glass plate 1, a silicon plate 2a, and an upper glass plate 3 are laminated. The lower glass plate 1 has capacitance detection electrodes 11. The silicon plate 2a has a weight 21 which is displaced due to acceleration applied thereto and silicon columns 221 for connecting the lower electrodes (capacitance detection electrodes) 11 with upper electrodes 34. The upper glass plate 3 has capacitance detection electrodes 31.

Figure 2:
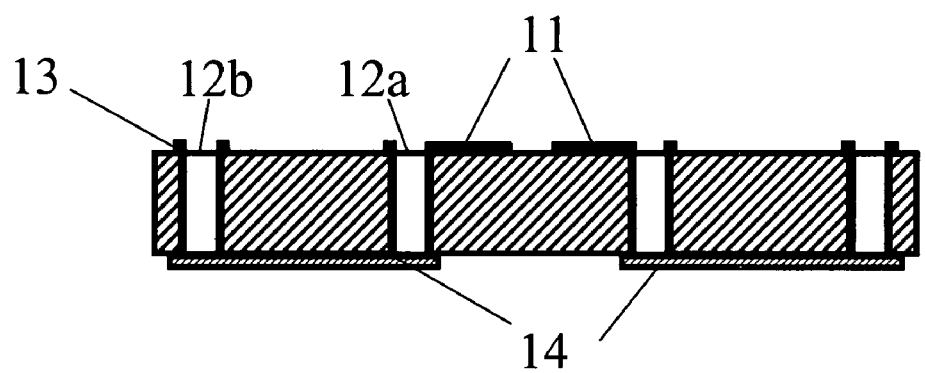
FIG. 2 is a side sectional view showing a lower glass plate in the sensor shown in FIG. 1.

FIG. 2 is a perspective side view showing the lower glass plate 1. The lower glass plate 1 is made of mainly $SiO_2$ and has a thermal expansion coefficient equal to that of the silicon plate 2a. A thickness of the lower glass plate 1 is about 100 μm or more.

The capacitance detection electrodes 11, each of which have a thickness of about 1 μm or less and are made of Al or the like, are formed on a bonding surface with the silicon plate 2a by sputtering or the like. The electrodes 11 are connected with external electrodes 14 through through-holes 12a and led from a rear surface of the lower glass plate 1 to an upper surface thereof through through-holes 12b to be connected with lower portions 22b of the silicon columns 221.

Figure 3:
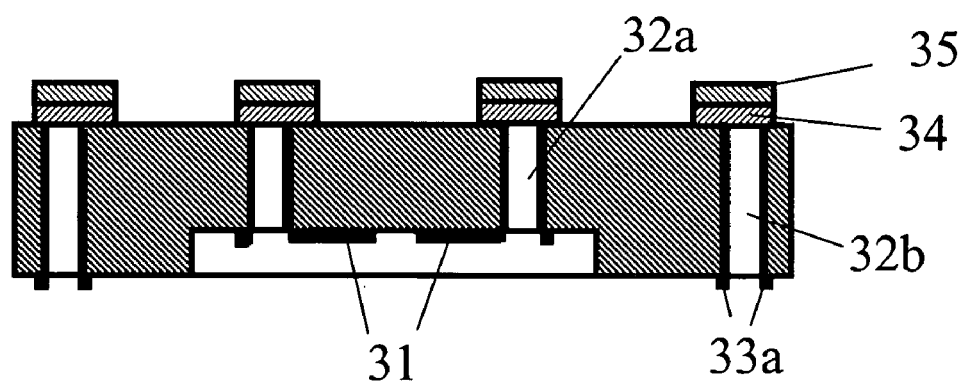
FIG. 3 is a side sectional view showing an upper glass plate in the sensor shown in FIG. 1.

FIG. 3 a side sectional view showing the upper glass plate 3. As in the case of the lower glass plate 1, the upper glass plate 3 is made of mainly $SiO_2$ and has a thermal expansion coefficient equal to that of the silicon plate 2a. A thickness of the upper glass plate 3 is about 100 μm or more.

The capacitance detection electrodes 31, each of which have a thickness of about 1 μm or less and are made of Al or the like, are located at a position recessed from a bonding surface with the silicon plate 2a by several 1 μm. The capacitance detection electrodes 31 are formed by sputtering using Al and connected with the N-type silicon layers (upper electrodes) 34 bonded to an external surface of the upper glass plate 3 through through-holes 32a. Electrodes 33a for leading a potential of each of the silicon columns 221 formed in the silicon plate 2a and electrodes 33c (not shown) for leading a potential of the weight 21 formed in the silicon plate 2a are provided on the bonding surface with the silicon plate 2a. The electrodes 33a are connected with the N-type silicon layers 34 bonded to the external surface of the upper glass plate 3 through through-holes 32b. The electrodes 33c are connected with the N-type silicon layer 34 through through-holes 32d (not shown). Al layers are formed as electrode pads 35 on external surfaces of the N-type silicon layers 34 by sputtering. This sensor is mounted on an external substrate through the electrode pads 35 made of Al by wire bonding or the like.

Figure 4A:
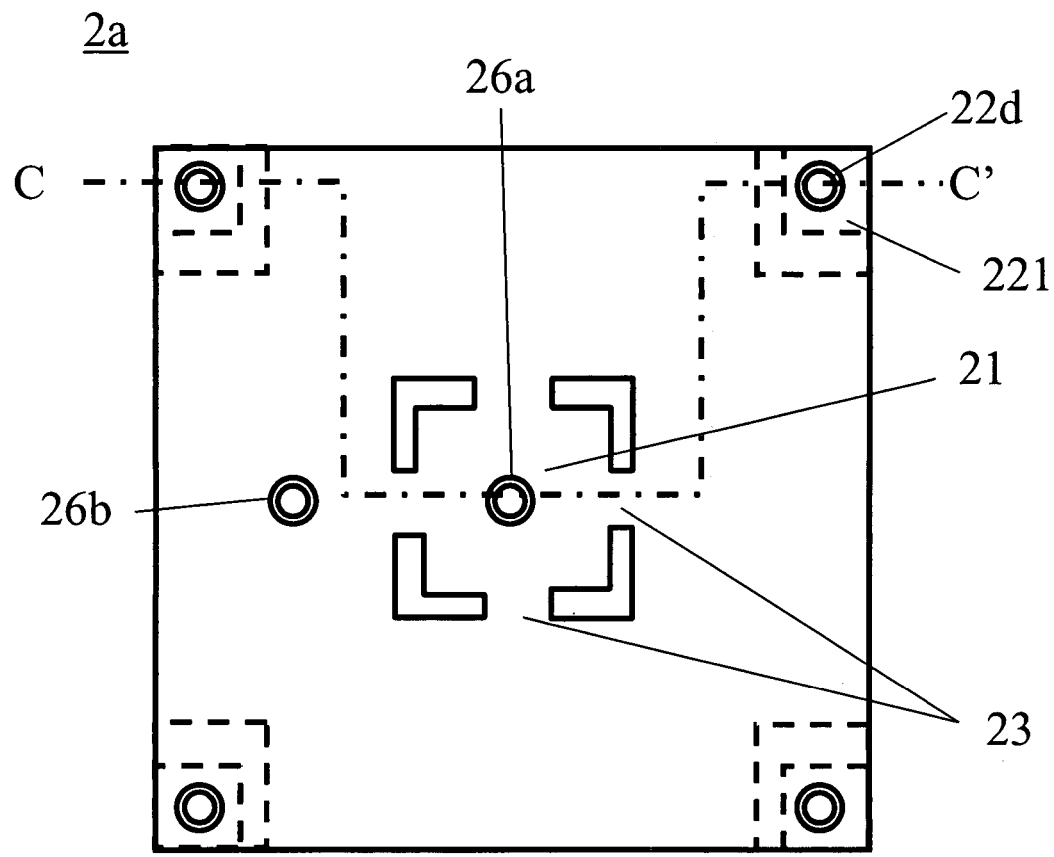
FIG. 4A is a plan view showing a silicon plate in the sensor shown in FIG. 1
Figure 4B:
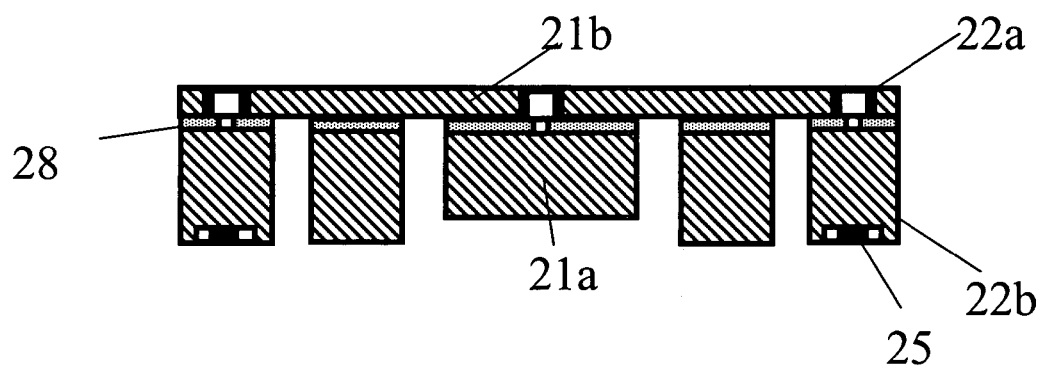
FIG. 4B is a side sectional view showing the silicon plate in the sensor shown in FIG. 1.

FIG. 4A is a plan view showing the silicon plate 2a and FIG. 4B is a side sectional view showing the silicon plate 2a along a line C-C' in FIG. 4A. In order to form the weight 21 and process the silicon column 221, a SOI substrate including an insulating layer 28 in the silicon plate is used as the silicon plate 2a. The weight 21 displaced due to acceleration applied from the outside is formed near a central portion of the silicon plate 2a by etching.

As described above, the SOI substrate is used as the silicon plate 2a. The insulating layer 28 is formed in an intermediate portion of the weight 21 to insulate upper and lower silicon layers 21a and 21b from each other therethrough. In order to provide the same potential for the upper and lower silicon layers of the weight 21, a stepped recess is formed so as to reach the lower silicon layer 21b through the insulating layer 28. An electrode 26a made of Al is formed in the stepped recess by sputtering to electrically connect the silicon layers 21a and 21b with each other.

The weight 21 is electrically connected with the external terminal (electrode pad) 35 through the electrode 33c of the upper glass plate 3 by an electrode 26b, so that external control is possible.

Figure 5:
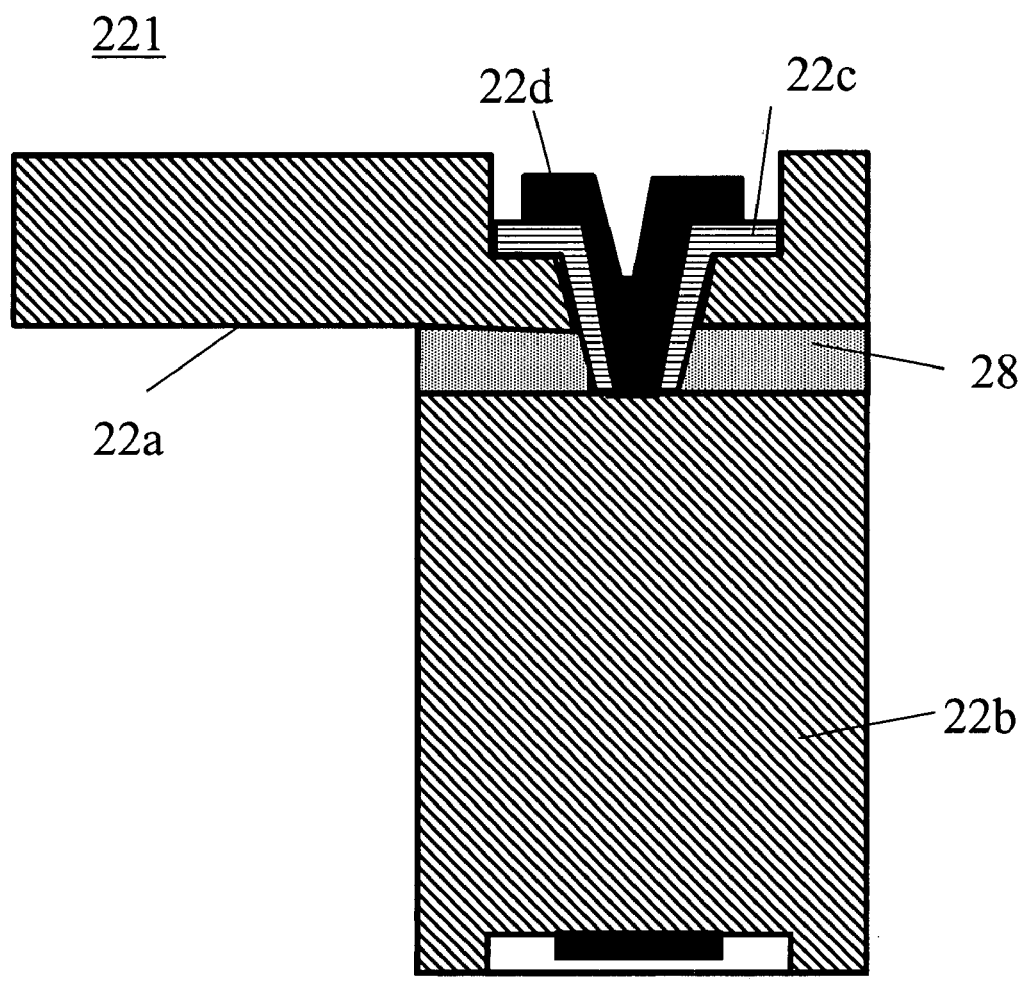
FIG. 5 a side view showing a silicon column in the sensor shown in FIG. 1.

During the etching process for forming the weight 21, the lower portions 22b of the silicon columns are etched. Consequently, the lower portions 22b of the silicon-columns are electrically and mechanically separated from one another. As shown in FIG. 5, an insulator 22c and a conductor 22d are located in an upper portion 22a of each of the silicon columns by etching a part of the upper portion 22a in advance. As a result, the upper portions of the respective columns can be electrically isolated from one another without mechanical separation. In addition, it is possible to make the electrical conduction between the electrodes formed in the upper and lower glass plates through the respective silicon columns 221.

Other constituent elements of the silicon plate 2a are beam portions 23 for supporting the weight 21 and portions for anode-bonding the lower glass plate 1 to the upper glass plate 3.

With respect to a basic method of manufacturing the capacitive dynamic quantity (acceleration) sensor 7a, the lower glass plate 1 and the silicon plate 2a are positioned to an arbitrary position and then bonded to each other. Anode bonding is used in which a voltage of about 400 V is applied between the lower glass plate 1 and the silicon plate 2a at an atmospheric temperature of about 300° C.

After that, the upper glass plate 3 and the silicon plate 2a boned to the lower glass plate 1 are positioned to an arbitrary position and then anode bonding is performed to manufacture the sensor.

Embodiment 2

In Embodiment 2, a depletion layer is formed using different impurities to isolate the respective columns from one another at upper portions thereof. Hereinafter, the same references are provided for the same portions as those in Embodiment 1 and thus the description thereof is omitted. Points different from Embodiment 1 will be mainly described with reference to FIGS. 6 to 8.

Figure 6:
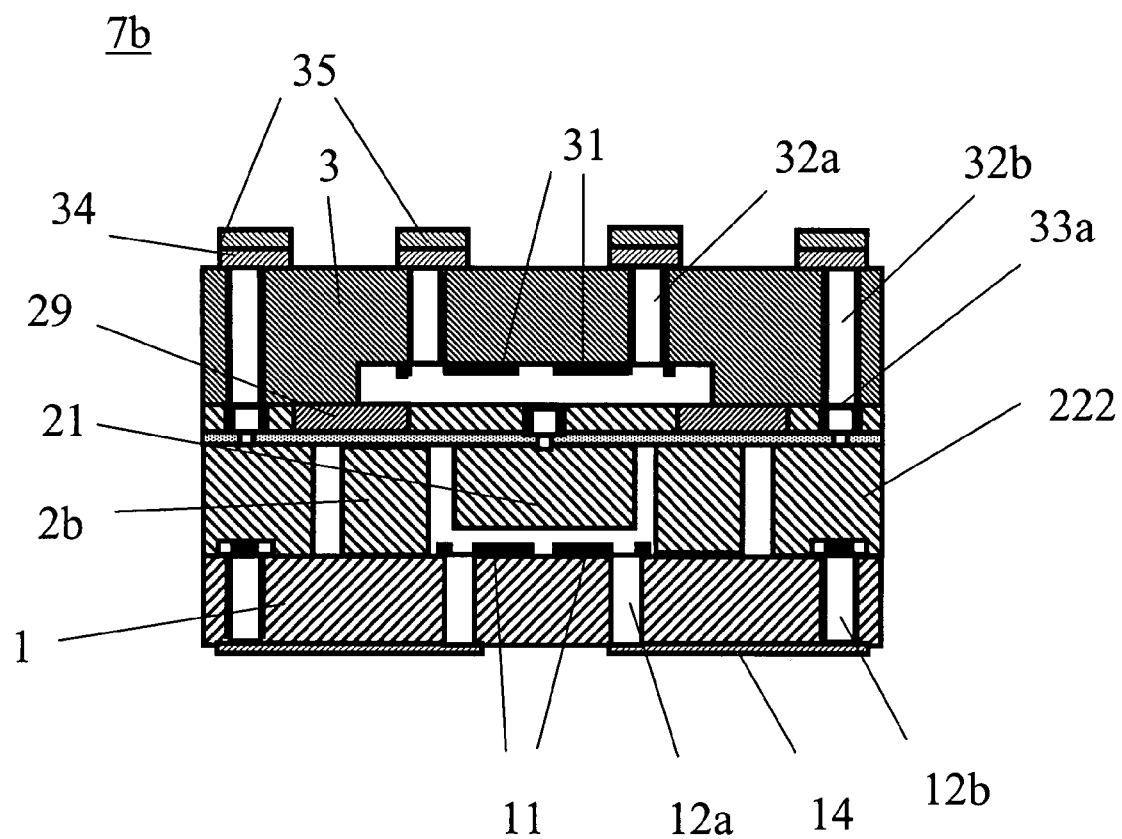
FIG. 6 is a side sectional view showing a capacitive dynamic quantity sensor according to Embodiment 2 of the present invention.
Figure 7A:
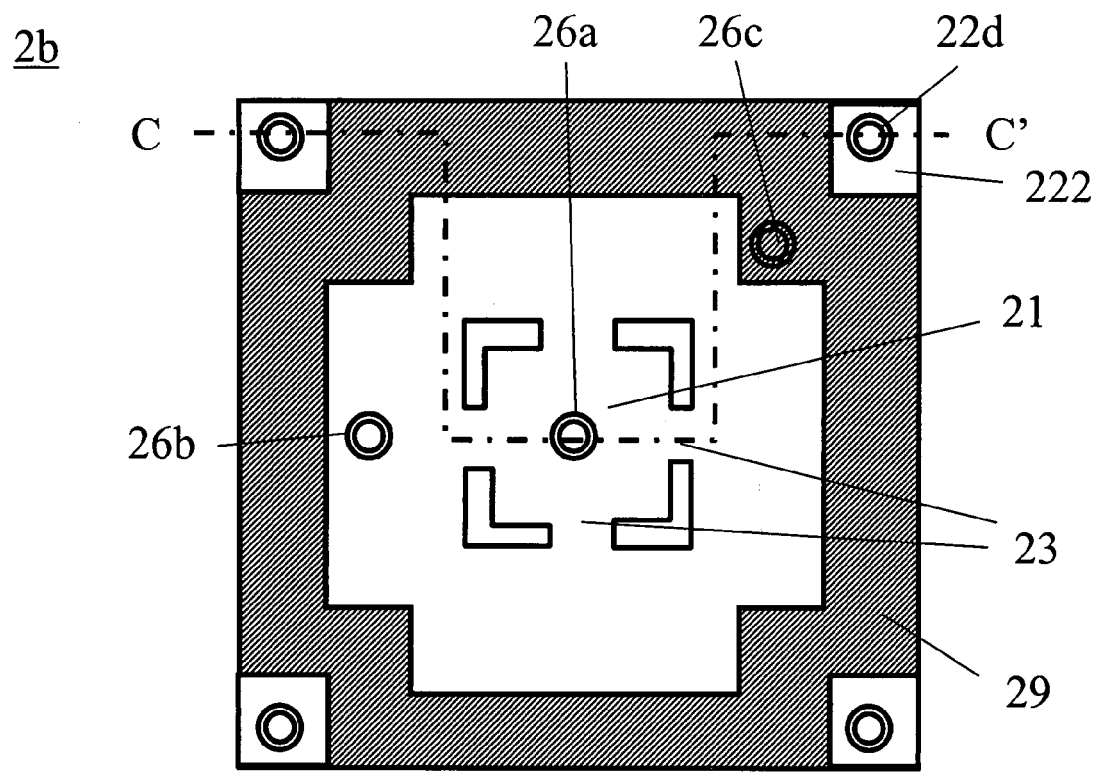
FIG. 7A is a plan view showing a silicon plate in the sensor shown in FIG. 6
Figure 7B:
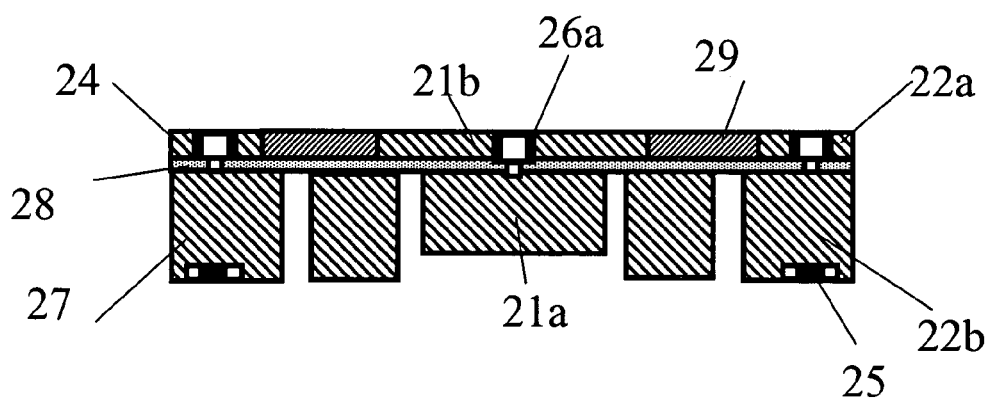
FIG. 7B is a side sectional view showing the silicon plate in the sensor shown in FIG. 6.

FIG. 6 is a side sectional view showing a capacitive dynamic quantity sensor 7b according to Embodiment 2 of the present invention.

The capacitive dynamic quantity sensor 7b has a structure in which the lower glass plate 1, a silicon plate 2b, and the upper glass plate 3 are laminated. The lower glass plate 1 has the capacitance detection electrodes 11. The silicon plate 2b has the weight 21 which is displaced due to acceleration applied thereto and silicon columns 222 for connecting the lower electrodes (capacitance detection electrodes) 11 with the upper electrodes 34. The upper glass plate 3 has the capacitance detection electrodes 31.

The capacitance detection electrodes 31, each of which have a thickness of about 1 µm or less and are made of Al or the like, are located at the position recessed from the bonding surface of the upper glass plate 3 with the silicon plate 2a by several µm. The capacitance detection electrodes 31 are formed by sputtering using Al and connected with the N-type silicon layers (upper electrodes) 34 bonded to the external surface of the upper glass plate 3 through the through-holes 32a. The electrodes 33a for leading a potential of each of the silicon columns 222 formed in the silicon plate 2b, electrodes 33b (not shown) for leading a potential of a different impurity layer 29 formed in a part of the upper portion 22a of each of the columns 222, and the electrodes 33c (not shown) for leading a potential of the weight 21 formed in the silicon plate 2b are provided on the bonding surface with the silicon plate 2b. The electrodes 33a are connected with the N-type silicon layer 34 bonded to the external surface of the upper glass plate 3 through a through-hole 32b. The electrode 33b are connected with the N-type silicon layer 34 through a through-hole 32c (not shown). The electrodes 33c are connected with the N-type silicon layer 34 through the through-hole 32d (not shown). Al layers are formed as the electrode pads 35 on external surfaces of the N-type silicon layers 34 by sputtering. This sensor is mounted on an external substrate through the electrode pads 35 made of Al by wire bonding or the like.

Figure 8:
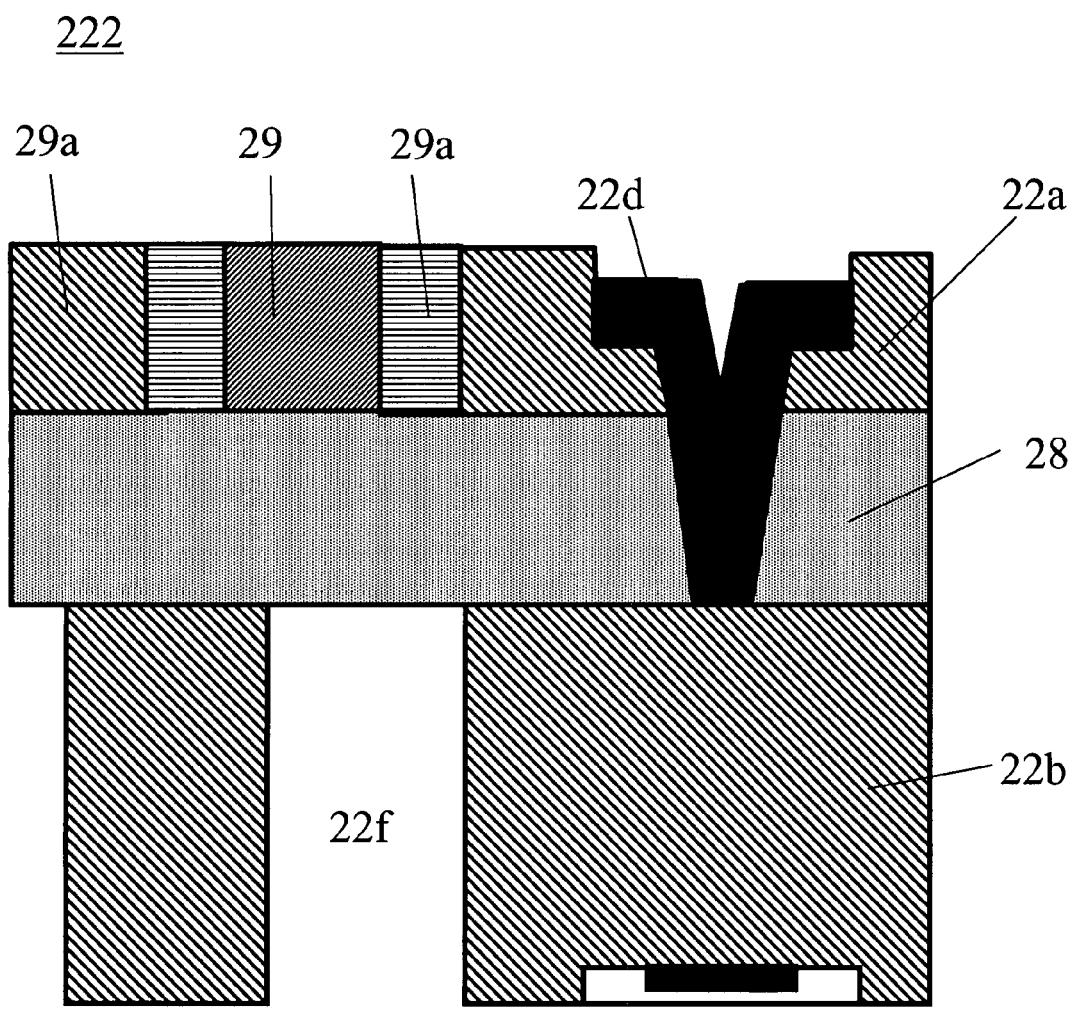
FIG. 8 a side view showing a silicon column in the sensor shown in FIG. 6.

As shown in FIG. 8, the different type (N-type) of impurity layer 29 is formed in a part of the upper portion 22a of the silicon column 222. Since a potential of the different type (N-type) of impurity layer 29 is set to a voltage equal to or larger than a maximum applicable voltage value to this sensor through an electrode 26c, reverse bias is constantly applied to a semiconductor PN junction of the silicon column 222, with the result that electrical isolation of the respective columns 222 can thus be electrically isolated from one another without mechanical separation. In addition, in order to provide the same potential for the upper and lower portions of each of the silicon columns 222, a stepped recess is formed so as to reach the lower silicon layer 22b through the insulating layer 28. An electrode 22d made of Al is formed in the stepped recess by sputtering to electrically connect the silicon layers (upper and lower portions) 22a and 22b with each other. A lower glass electrode and an upper glass electrode can, therefore, be electrically connected with each other through the silicon column 222.

A SOI substrate having an upper Si layer 24 doped with an N-type impurity and a lower Si layer 27 doped with the N-type impurity can be used as the silicon plate 2b. Here, assume that a P-type impurity serving as a different type of impurity is used for a part of the upper portion 22a of the silicon column 222 and a potential of the part including the P-type impurity is set to a voltage equal to or smaller than a minimum applicable voltage value to this sensor through the electrode 26c. In such a case, reverse bias is constantly applied to a hetero-semiconductor junction of the silicon column, with the result that the electrical isolation using the depletion layer 29a is realized. Thus, the upper portions 22a of the respective columns 222 can be electrically isolated from one another without mechanical separation, thereby obtaining the same effect.

Embodiment 3

In Embodiment 3, a slit is formed in each of the upper portions of the columns to isolate the columns from one another. Hereinafter, the same references are provided for the same portions as those in Embodiment 2 and thus the description thereof is omitted. Points different from Embodiment 2 will be mainly described with reference to FIGS. 9 to 11.

Figure 9:
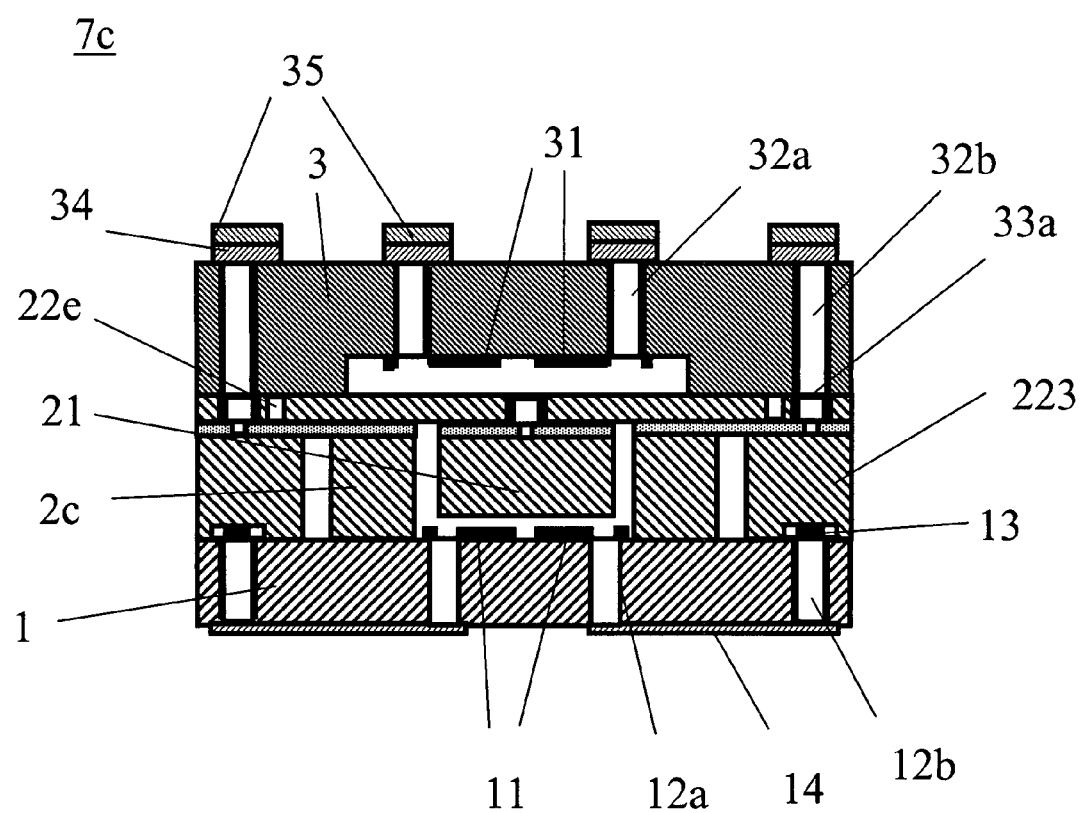
FIG. 9 is a side sectional view showing a capacitive dynamic quantity sensor according to Embodiment 3 of the present invention.
Figure 10A:
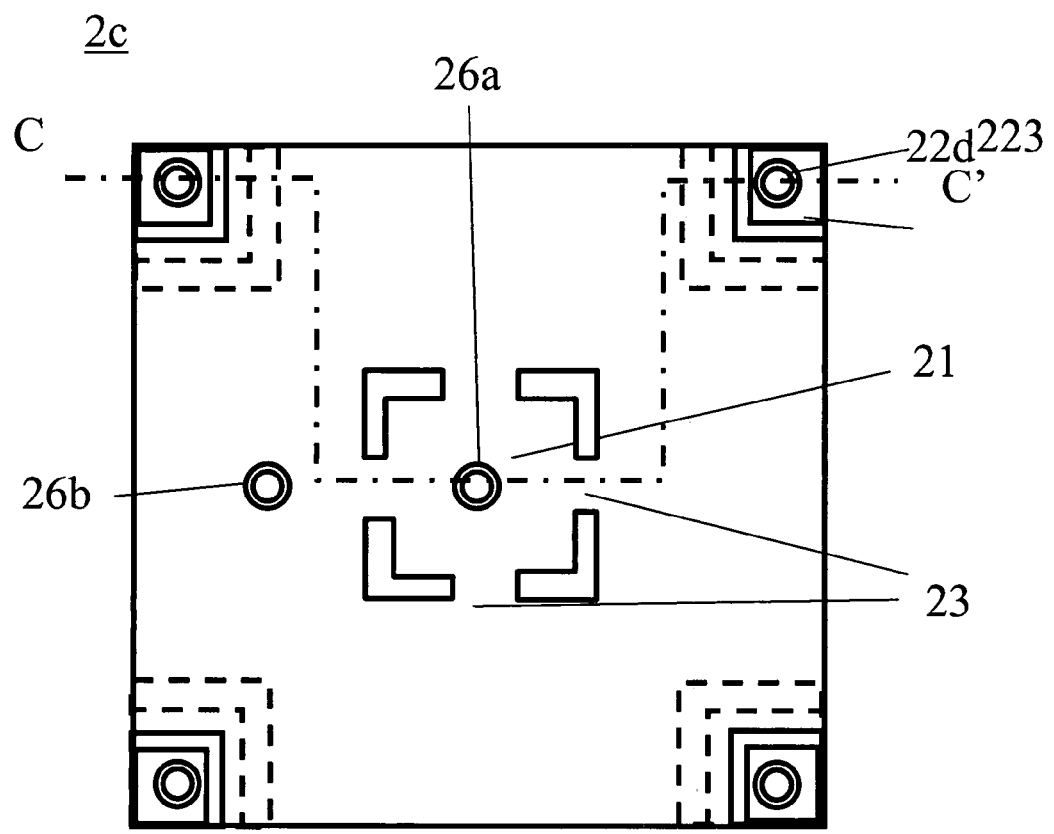
FIG. 10A is a plan view showing a silicon plate in the sensor shown in FIG. 9
Figure 10B:
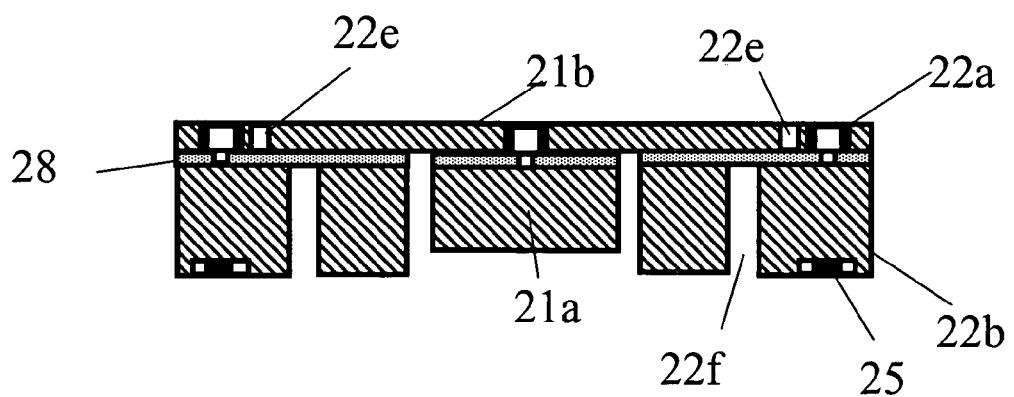
FIG. 10B is a side sectional view showing the silicon plate in the sensor shown in FIG. 9.

FIG. 9 is a side sectional view showing a capacitive dynamic quantity sensor 7c according to Embodiment 3 of the present invention.

The capacitive dynamic quantity sensor 7c has a structure in which the lower glass plate 1, a silicon plate 2c, and the upper glass plate 3 are laminated. The lower glass plate 1 has the capacitance detection electrodes 11. The silicon plate 2c has the weight 21 which is displaced due to acceleration applied thereto and silicon columns 223 for connecting the lower electrodes (capacitance detection electrodes) 11 with the upper electrodes 34. The upper glass plate 3 has the capacitance detection electrodes 31.

In this embodiment, etching is performed so as to provide slits 22e, each of which is used to separate the upper portion 22a of a column from that of another column. Consequently, the respective columns can be electrically isolated from one another without mechanical separation of the insulating layer 28 formed in the intermediate portion of each of the columns. In addition, the electrical conduction can be made between the electrodes formed in the upper and lower glass plates through each of the silicon columns.

Figure 11:
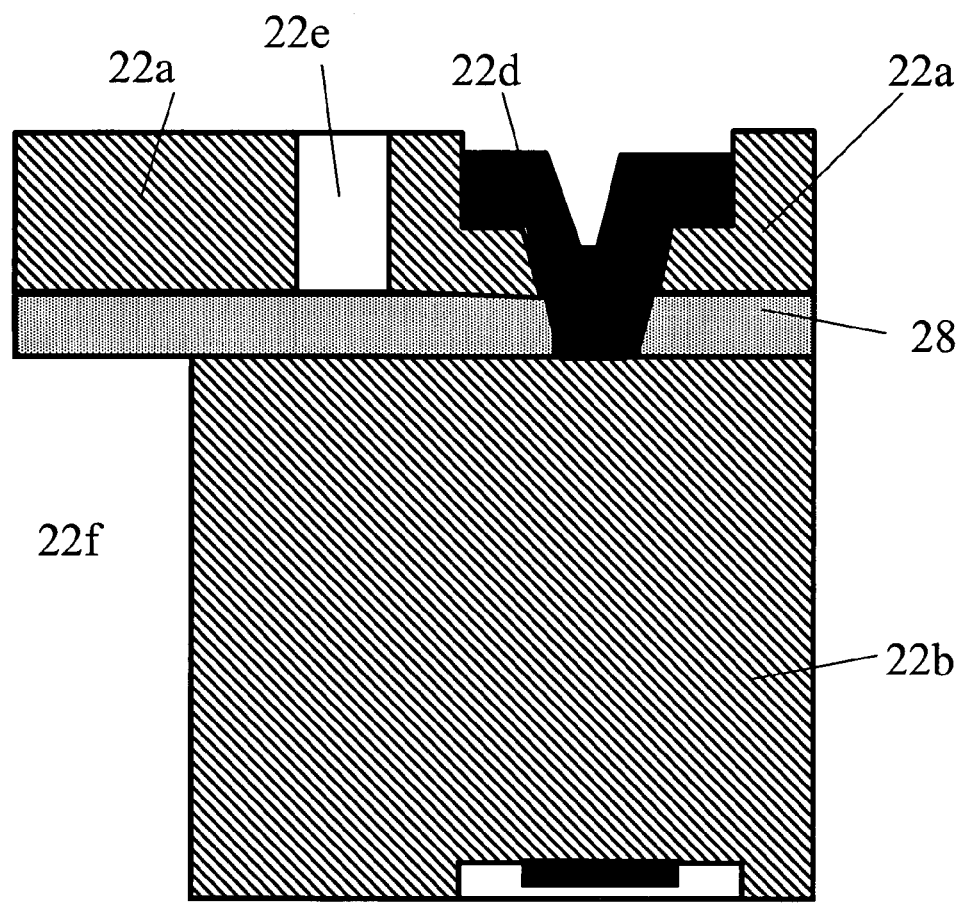
FIG. 11 a side view showing a silicon column in the sensor shown in FIG. 9.

As shown in FIG. 11, in view of the mechanical strength of the semiconductor substrate, etching is performed so as to shift the position of the slit 22e of the upper portion of the column from the position of a slit 22f of the lower portion 22b of the column. It is possible to improve the mechanical strengths of the silicon columns 223 and the silicon plate 2c.

Embodiment 4

Figure 12A:
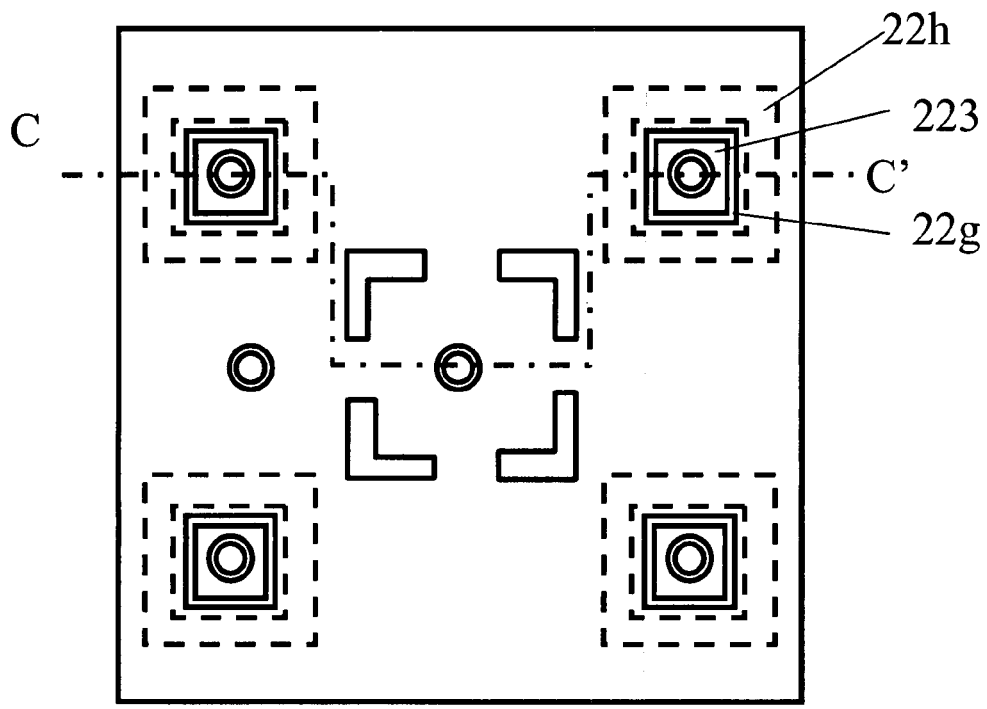
FIG. 12A is a plan view showing a silicon plate in a capacitive dynamic quantity sensor according to Embodiment 4 of the present invention and FIG. 12B is a side sectional view showing the silicon plate in the capacitive dynamic quantity sensor according to Embodiment 4 of the present invention.

In Embodiment 4, in order to isolate the columns from one another, a slit is formed in each of the upper portions of the columns so as to surround the upper portion of a corresponding column on all four sides and a slit is formed in each of the lower portions of the columns so as to surround the lower portion of a corresponding column on all four sides. Hereinafter, the same references are provided for the same portions as those in Embodiment 3 and thus the description thereof is omitted. Points different from Embodiment 3 will be mainly described with reference to FIGS. 12A and 12B.

Figure 12B:
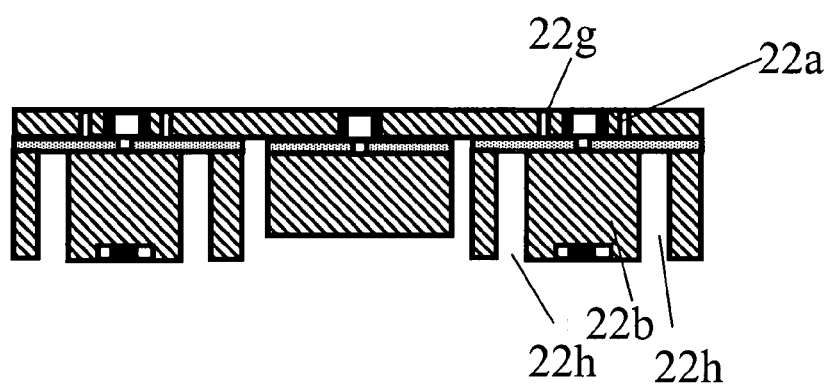

FIG. 12b is a side sectional view showing a silicon plate 2d of a capacitive dynamic quantity sensor according to Embodiment 4 of the present invention.

Figure 13:
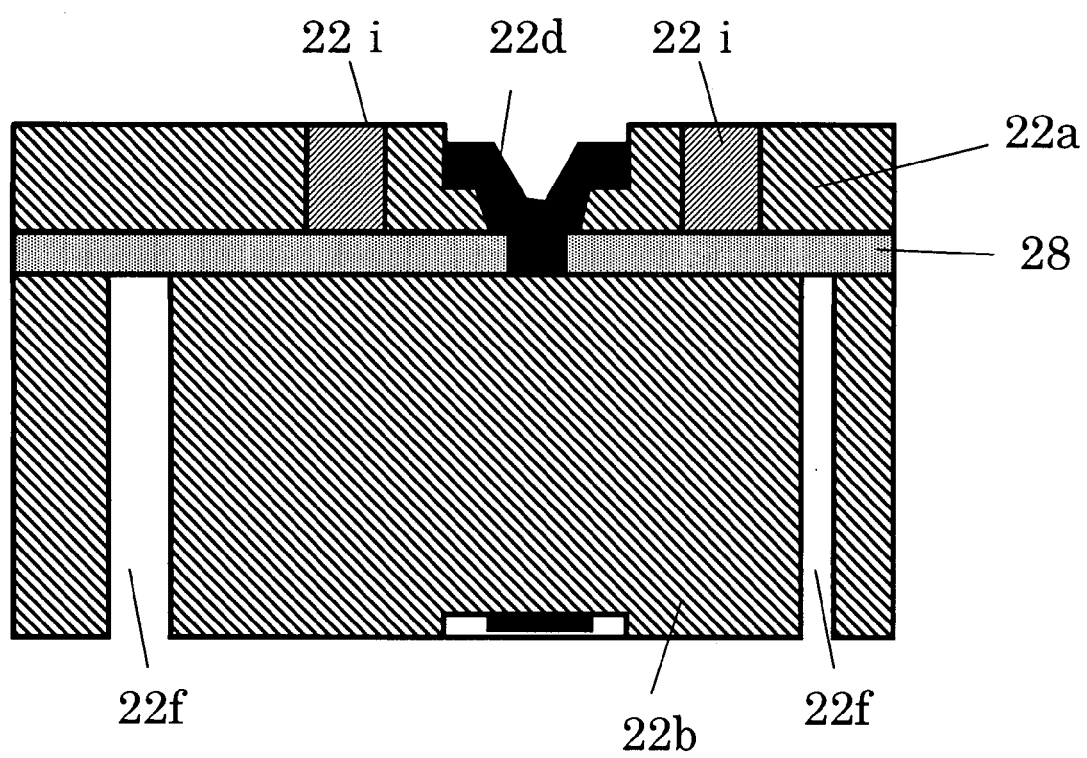
FIG. 13 a side view showing a silicon column in the sensor shown in FIG. 12.

In this Embodiment, a slit 22g formed in each of the upper portions of the columns is located so as to surround the upper portion of a corresponding column on all four sides and a slit 22h formed in each of the lower portions of the columns is located so as to surround the lower portion of a corresponding column on all four sides. Accordingly, it is not limited to locate the silicon columns 223 at the corners of the sensor. The column can be formed at an arbitrary position which is within a region on which slit processing can be performed. FIG. 13 shows a state in which an insulator 22*i* is embedded in the slit 22*g* located in the upper portion of the column. When the insulator 22*i* is used, the mechanical strength can be improved while isolation with other columns is maintained.

Embodiment 5

Hereinafter, a semiconductor electrical circuit part according to Embodiment 5 of the present invention will be described with reference to FIGS. 14 and 15.

Figure 14:
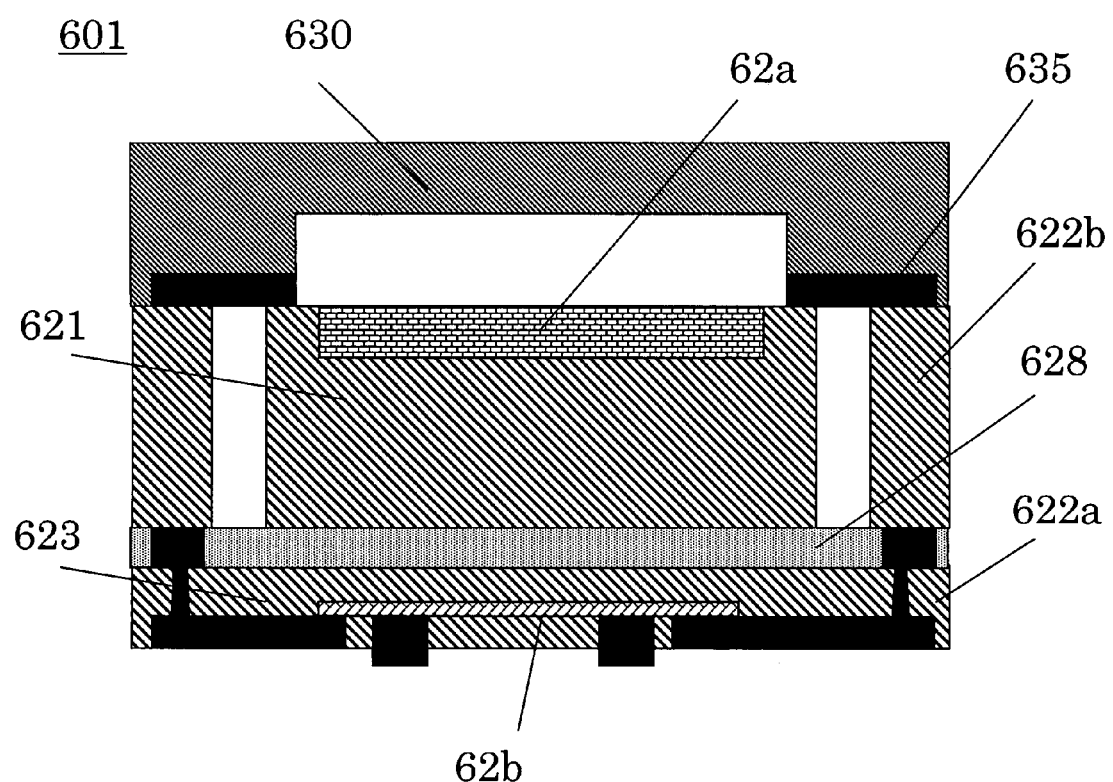
FIG. 14 is a side sectional view showing a semiconductor circuit part according to Embodiment 5 of the present invention.

FIG. 14 is a side sectional view showing a semiconductor electrical circuit part 601 according to this embodiment.

The semiconductor electrical circuit part 601 has a structure in which a glass substrate 630, an upper semiconductor substrate 621, a lower semiconductor substrate 623, and an insulator 628 are laminated. Electrodes 635 are located in the glass substrate 630. The upper semiconductor substrate 621 includes an image pickup element 62*a*. The lower semiconductor substrate 623 includes a circuit that processes a signal from the image pickup element 62*a*. The insulator 628 is sandwiched between the upper semiconductor substrate 621 and the lower semiconductor substrate 623. A silicon column 622 (662*a* or 662*b*) for transferring a signal outputted from the upper semiconductor substrate 621 to the lower semiconductor substrate 623 is located in each of the upper semiconductor substrate 621 and the lower semiconductor substrate 623.

Figure 15:
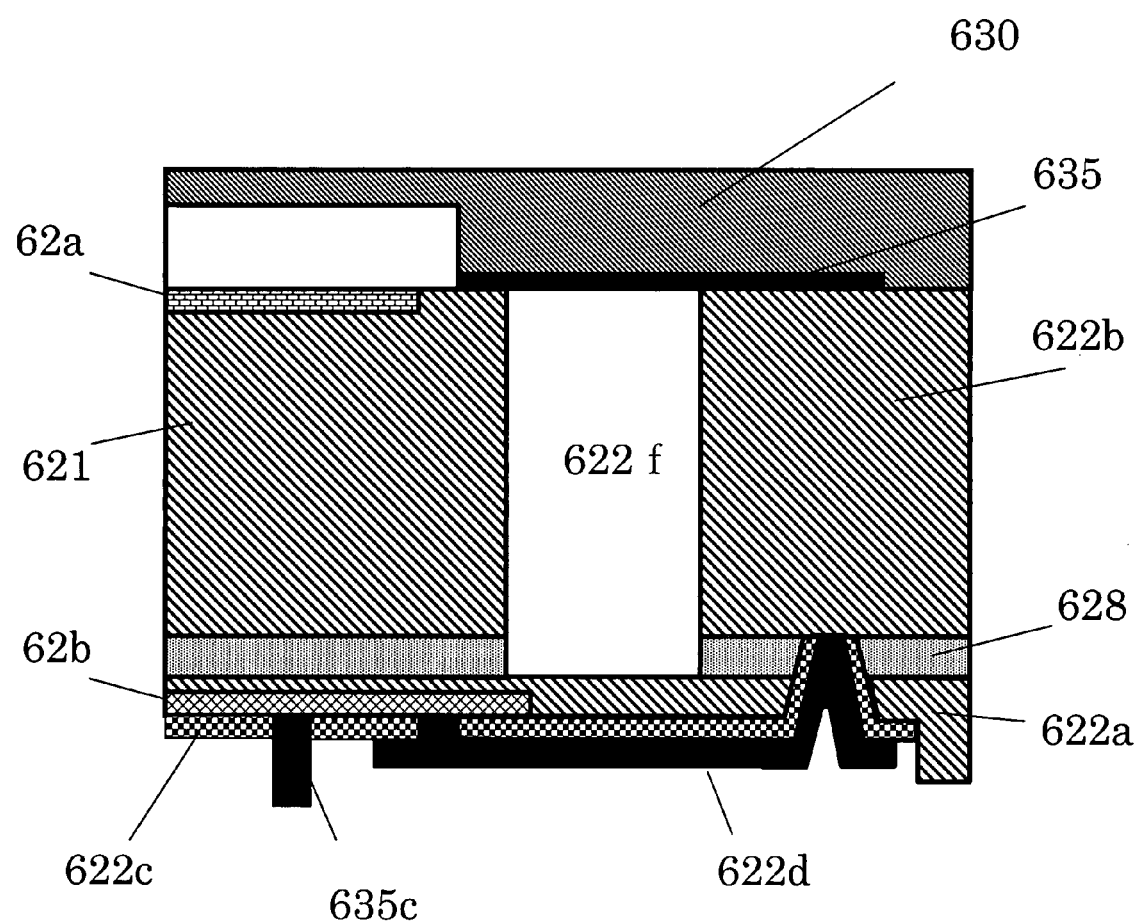
FIG. 15 is a side view showing a silicon column in the semiconductor circuit part shown in FIG. 14.

FIG. 15 is an enlarged view showing an electrical connection portion of the silicon columns.

An electrode 635 is located on the insulator (glass) 630 and electrically connects an electrode of the image pickup element with the silicon column.

The upper semiconductor substrate 621 is made of Si and has a thickness of about 10 μm or more. The image pickup element and the silicon column 622*b* for electrical signal transfer with the lower semiconductor substrate 623 are provided in the upper semiconductor substrate 621. A slit 622*f* is formed between the image pickup element and the silicon column of the upper semiconductor substrate to mechanically and electrically isolate them from each other.

The lower semiconductor substrate 623 is mainly made of Si as in the upper semiconductor substrate and has a thickness of about 100 μm or more, A signal processing IC 62*b* and the silicon column 622*a* for electrical signal transfer with the lower semiconductor substrate are provided in the upper semiconductor substrate 623.

An electrode 622*d* made of an Al film is provided in the lower column and the lower semiconductor substrate. The electrical connection between the lower column and the lower semiconductor substrate is realized through the Al film. The semiconductor electrical circuit part is mounted on an external substrate through an electrode pad 635*c* by wire bonding, surface mounting, or the like.

As also described earlier, a so-called SOI substrate in which an insulating layer 628 is located between the upper semiconductor substrate 621 and the lower semiconductor substrate 623 is used, thereby insulating the upper semiconductor substrate 621 and the lower semiconductor substrate 623 from each other.

In order to make the electrical connection between the upper silicon column 622*a* and the lower silicon column 622*b*, a stepped recess is formed at 622*a* so as to reach the upper silicon column 622*b* through the insulating layer 628. An insulating layer 622*c* is formed in the stepped recess. Then, an electrode 622*d* made of Al is formed on the insulating layer 622*c* by sputtering to electrically connect the silicon columns 622*a* and 622*b* with each other. Thus, a potential of the upper silicon column 622*a* can be transferred as a circuit signal to the lower semiconductor substrate.

When the upper silicon column 622*b* is etched, the upper silicon column 622*b* is electrically and mechanically separated from other members. Consequently, it is possible to make electrical isolation without mechanical separation of the upper portions of the respective columns. In addition, it is possible to make the electrical conduction between the electrodes formed in the upper and lower semiconductor substrates through the respective silicon columns 622*a* and 622*b*. As a result, an electrical signal can be transferred between the image pickup element 62*a* and the signal processing IC 62*b*.

Embodiment 6

Hereinafter, a semiconductor electrical circuit part according to Embodiment 6 of the present invention will be described with reference to FIGS. 16 and 17.

Figure 16:
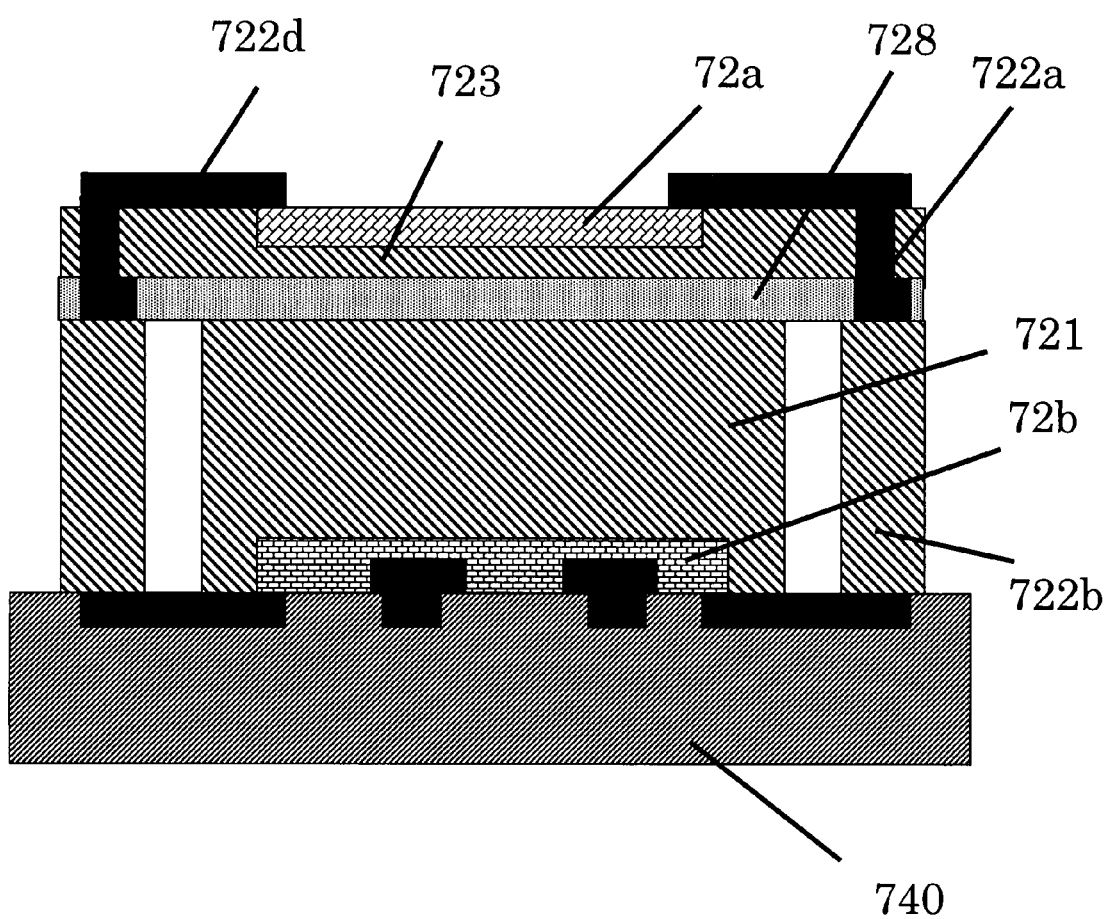
FIG. 16 is a side sectional view showing a semiconductor circuit part according to Embodiment 6 of the present invention.

FIG. 16 is a side sectional view showing a semiconductor electrical circuit part 701 according to this embodiment.

The semiconductor electrical circuit part 701 has a structure in which an upper semiconductor substrate 723 having a circuit 72*a*, a lower semiconductor substrate 721, and an insulator 728 are laminated. The lower semiconductor substrate 721 includes a circuit 72*b* that operates in response to a signal from the circuit 72*a*. The insulator 728 is sandwiched between the upper semiconductor substrate 723 and the lower semiconductor substrate 721. Silicon columns 772*a* and 722*b* for transferring a signal outputted from the upper semiconductor substrate 723 to the lower semiconductor substrate 721 are located in the upper semiconductor substrate 723 and the lower semiconductor substrate 721, respectively. The semiconductor substrates are mounted on an insulator substrate 740 in which a circuit pattern necessary to incorporate the semiconductor substrates in the sensor is formed in advance.

Figure 17:
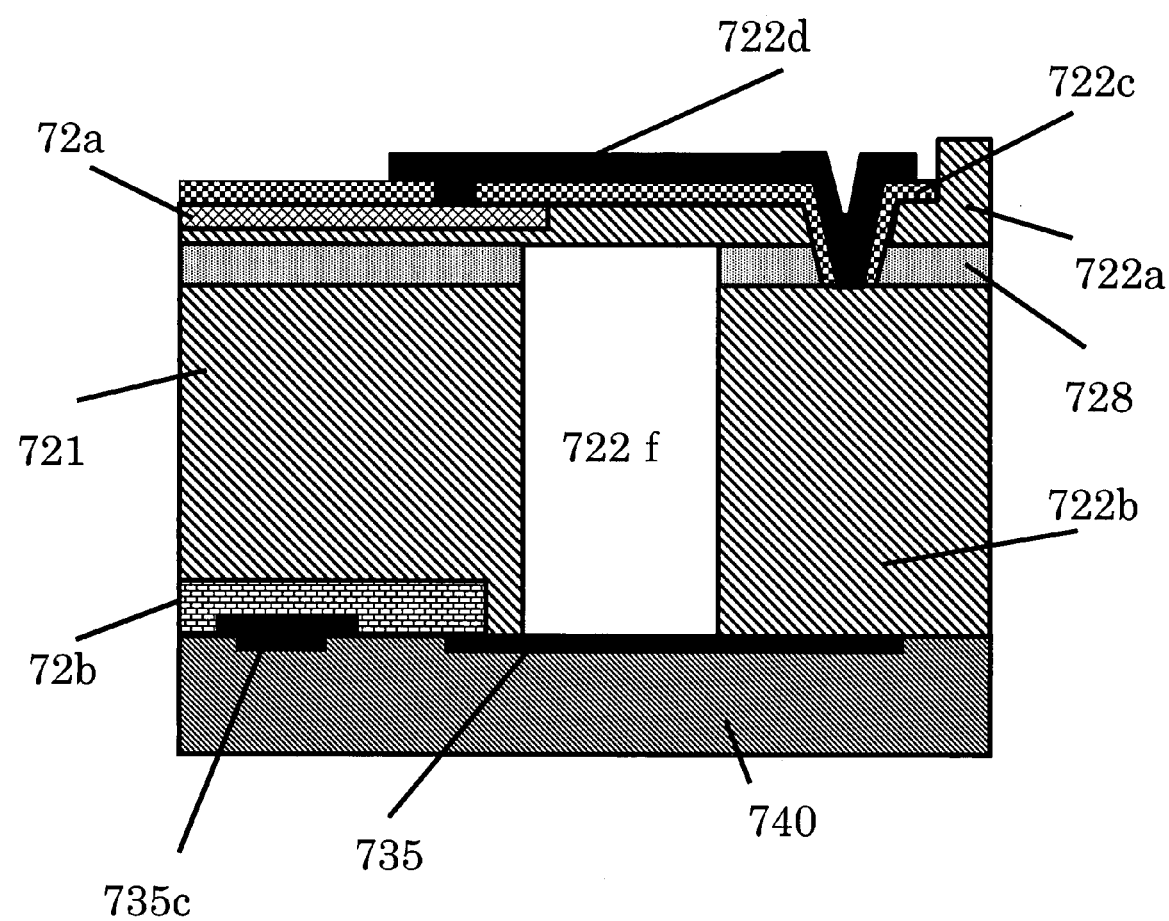
FIG. 17 is a side view showing a silicon column in the semiconductor circuit part shown in FIG. 16.
Figure 18:
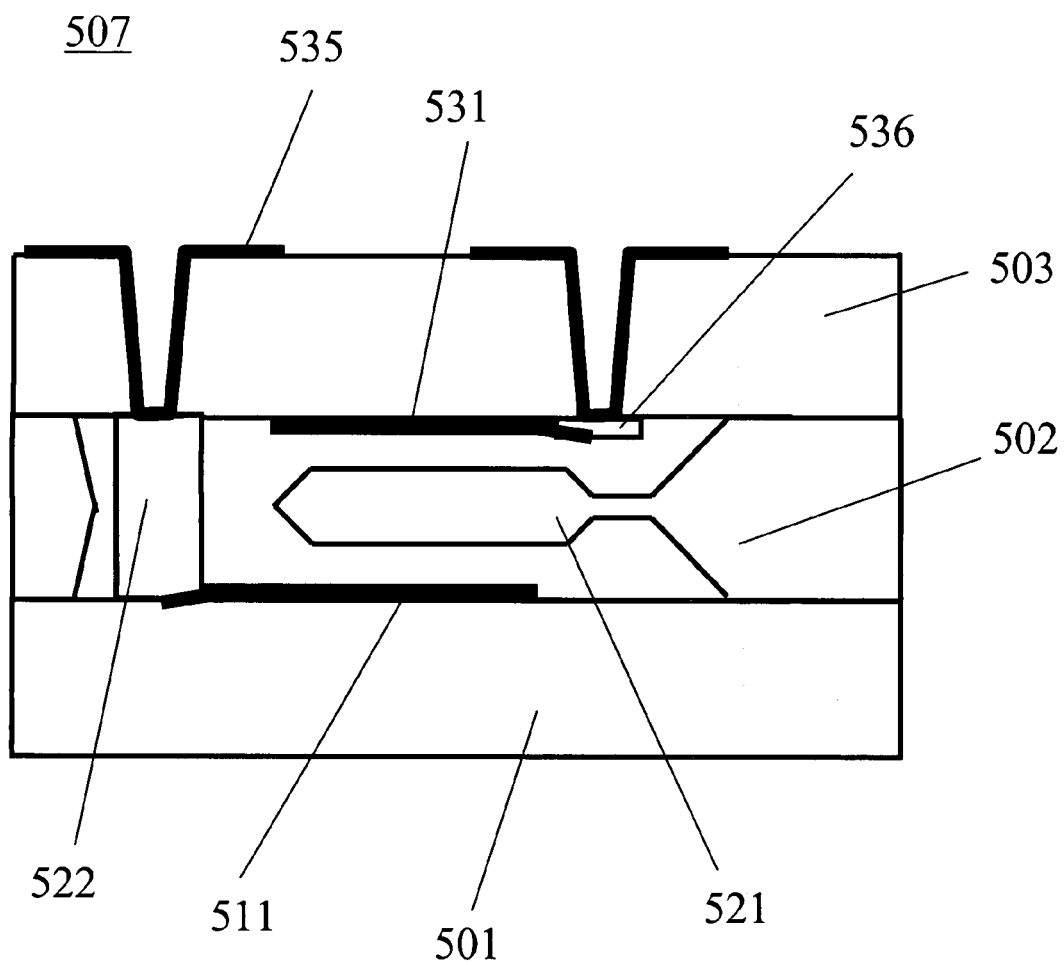
FIG. 18 is a side view showing a conventional capacitive dynamic quantity sensor.

FIG. 17 is an enlarged view showing an electrical connection portion of the silicon columns.

An electrode 735 is located on the substrate 740 and electrically connects an electrode of the lower semiconductor substrate 721 (circuit 72*b*) with the silicon column 722*b*.

The upper semiconductor substrate 723 is made of Si and has a thickness of about 10 μm or more. The circuit (element) 72*a* and the silicon column 722*a* for electrical signal transfer with the lower semiconductor substrate 721 are provided in the upper semiconductor substrate 723.

As in the upper semiconductor substrate 723, the lower semiconductor substrate 721 is made of mainly Si and has a thickness of about 100 μm or more. A slit 722*f* is formed between the circuit (element) 72*b* and the silicon column 722*b* to mechanically and electrically isolate them from each other.

An electrode 722*d* made of an Al film is provided in the upper column 772*a* and the upper semiconductor substrate 723. The electrical connection between the upper column 772*a* and the upper semiconductor substrate 723 is realized through the Al film. The semiconductor electrical circuit part 701 is mounted on an external substrate through an electrode pad 735*c* by wire bonding, surface mounting, or the like.

As also described earlier, a so-called SOI substrate in which the insulating layer 728 is located between the upper semiconductor substrate 723 and the lower semiconductor substrate 721 is used, thereby insulating the upper semiconductor substrate 723 and the lower semiconductor substrate 721 from each other.

In order to make the electrical connection between the upper silicon column 722*a* and the lower silicon column 722*b*, a stepped recess is formed so as to reach the lower silicon column 722*b* through the insulating layer 728. An insulating layer 722*c* is formed in the stepped recess. Then, an electrode 722*d* made of Al is formed on the insulating layer 722c by sputtering to electrically connect the silicon columns 722a and 722b with each other. Thus, a potential of the lower silicon column 722b can be transferred as a circuit signal to the upper circuit element 72a.

When the lower silicon column 722b is etched, the lower silicon column 722b is electrically and mechanically separated from other members. Consequently, it is possible to make electrical isolation without mechanical separation of the upper portions of the respective columns. In addition, it is possible to make the electrical conduction between the electrodes formed in the upper and lower semiconductor substrates through the respective silicon columns 722a and 722b. As a result, an electrical signal can be transferred between the circuit elements 72a and 72b.

What is claimed is:

1. A capacitive dynamic quantity sensor, comprising:
a first insulator having a first electrode formed thereon;
a second insulator having a second electrode formed thereon; and
a semiconductor having a weight formed therein, which displaces due to a dynamic quantity,
the first insulator, the semiconductor, and the second insulator being laminated,
the capacitive dynamic quantity sensor measuring the dynamic quantity based on a change in capacitance value among the weight and the first electrode, which is caused by displacement of the weight, wherein:
a column is formed in the semiconductor so that the first electrode is electrically connected with the second electrode;
the column is composed of an upper conductive portion, an intermediate insulating portion, and a lower conductive portion;
an electrical connecting means which connects the upper conductive portion with the lower conductive portion is disposed on the upper portion of the column
the upper portion of the column is not mechanically isolated from other columns; and
the electrical connecting means disposed on the upper portion of the column is electrically isolated from other electrical connecting means disposed on upper portion of other columns.

2. A capacitive dynamic quantity sensor according to claim 1, wherein the upper portion of the column is electrically isolated from an upper portion of another column by an insulating layer provided in the semiconductor and an insulating layer formed in the upper portion of the column.

3. A capacitive dynamic quantity sensor, comprising:
a first insulator having a first electrode formed thereon;
a second insulator having a second electrode formed thereon; and
a semiconductor of a first conductivity type having a weight formed therein, which displaces due to a dynamic quantity,
the first insulator, the semiconductor, and the second insulator being laminated,
the capacitive dynamic quantity sensor measuring the dynamic quantity based on a change in capacitance value among the weight and the first electrode pattern, which is caused by displacement of the weight formed in the semiconductor, wherein:
a column is formed in the semiconductor of the first conductivity type so that the first electrode is electrically connected with the second electrode;
the column is composed of an upper conductive portion, an intermediate insulating portion, and a lower conductive portion;
an electrical connecting means which connects the upper conductive portion with the lower conductive portion is disposed on the upper portion of the column
a part of an upper portion of the column is formed from a semiconductor of a second conductivity type;
the upper portion of the column is not mechanically isolated from other columns; and
the upper portion of the column is electrically isolated by a depletion layer of a junction made of the semiconductor of the first conductivity type and the semiconductor of the second conductivity type.

4. A capacitive dynamic quantity sensor according to claim 3, wherein the semiconductor of the first conductivity type is a P-type and the semiconductor of the second conductivity type formed in the part of the upper portion of the column is an N-type.

5. A capacitive dynamic quantity sensor according to claim 4, wherein a potential of the semiconductor of the N-type formed in the part of the upper portion of the column is set to a voltage equal to or larger than a maximum applicable voltage to the capacitive dynamic quantity sensor through the first electrode or the second electrode.

6. A capacitive dynamic quantity sensor according to claim 3, wherein the semiconductor of the first conductivity type is an N-type and the semiconductor of the second conductivity type formed in the part of the upper portion of the column is a P-type.

7. A capacitive dynamic quantity sensor according to claim 6, wherein a potential of the semiconductor of the P-type formed in the part of the upper portion of the column is set to a voltage equal to or smaller than a minimum applicable voltage to the capacitive dynamic quantity sensor through the first electrode or the second electrode.

* * * * *